(12) United States Patent
Roselli et al.

(10) Patent No.: US 9,889,806 B2
(45) Date of Patent: Feb. 13, 2018

(54) LIGHT WEIGHT BUS BARS, METHODS OF MANUFACTURE THEREOF AND ARTICLES COMPRISING THE SAME

(71) Applicant: GM Global Technology Operations LLC, Detroit, MI (US)

(72) Inventors: Eric Roselli, Royal Oak, MI (US); Mark J. McGuire, Amherstburg (CA); Edward D. Moss, Commerce Township, MI (US); Daniel K. Davis, Williamston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 199 days.

(21) Appl. No.: 14/058,711

(22) Filed: Oct. 21, 2013

(65) Prior Publication Data

US 2015/0107870 A1  Apr. 23, 2015

(51) Int. Cl.
*H02G 5/02* (2006.01)
*B60R 16/03* (2006.01)

(52) U.S. Cl.
CPC ............. *B60R 16/03* (2013.01); *H02G 5/02* (2013.01); *Y10T 29/49117* (2015.01)

(58) Field of Classification Search
CPC ...... B60R 16/03; H02G 5/02; Y10T 29/49117
See application file for complete search history.

(56) References Cited

U.S. PATENT DOCUMENTS

| | | | | |
|---|---|---|---|---|
| 4,003,619 A * | 1/1977 | Smith | .................. | H01R 31/085 439/510 |
| 4,496,820 A * | 1/1985 | Ritter | .................. | B23K 11/008 219/108 |
| 5,980,602 A * | 11/1999 | Carden | .................. | A61L 27/04 257/E23.112 |
| 6,191,357 B1 * | 2/2001 | Daoud | .................. | 174/50 |
| 6,252,166 B1 * | 6/2001 | Leschinger | .......... | H01R 13/655 174/51 |
| 6,712,169 B2 * | 3/2004 | Ryan | .................. | B60R 21/36 180/274 |
| 7,458,861 B1 * | 12/2008 | Eke | .................. | H01R 4/64 439/798 |
| 7,570,474 B1 * | 8/2009 | Hettermann | .......... | 361/218 |

(Continued)

FOREIGN PATENT DOCUMENTS

CN    201927718 U    8/2011

OTHER PUBLICATIONS

Chinese Office Action; Chinese Application No. 201410565742.9; dated Mar. 15, 2016; 7 pages.

*Primary Examiner* — Dhirubhai R Patel
(74) *Attorney, Agent, or Firm* — Cantor Colburn LLP

(57) ABSTRACT

Disclosed herein is a bus bar comprising a bar manufactured from a material that has a density of less than or equal to 2.70 grams per cubic centimeter; where the bar comprises a plurality of holes for facilitating contact between the bus bar and a grounding attachment. Disclosed herein too is a method comprising affixing one or more grounding attachments to a bus bar, where the bus bar comprises a bar manufactured from a material that has a density of less than or equal to 2.70 grams per cubic centimeter; where the bar comprises a plurality of holes for facilitating contact between the bus bar and a grounding attachment; and affixing the bus bar to the frame of an automobile.

9 Claims, 2 Drawing Sheets

(56) References Cited

U.S. PATENT DOCUMENTS

| | | | |
|---|---|---|---|
| 7,642,454 B2* | 1/2010 | Waites | 174/50 |
| 9,247,641 B2* | 1/2016 | Tadamasa | H01L 51/0023 |
| 2005/0199279 A1* | 9/2005 | Yoshimine | H01L 31/022425 |
| | | | 136/251 |

* cited by examiner

LIGHT WEIGHT BUS BARS, METHODS OF MANUFACTURE THEREOF AND ARTICLES COMPRISING THE SAME

BACKGROUND

This subject invention relates to light weight bus bars, methods of manufacture and to articles comprising the same.

With the recent increases in fuel prices and with the advent of legislation to minimize carbon emissions, it is desirable to introduce light weight automobiles for transportation. Light weight automobiles consume less fuel per mile traveled as a result of which they can travel further with lower carbon emissions per unit weight of fuel. In order to reduce automobile weight, it is desirable to reduce the weight of all parts used in the automobile. For example, automobile exterior panels are now manufactured from electrically conductive plastics in order to reduce automobile weight.

Bus bars are used in automobiles to conduct charges between automobile panels and other grounding bars used in the automobile. Bus bars are generally manufactured from steel, which is expensive and heavy. Accordingly, it is desirable to manufacture light weight bus bars to reduce the overall weight of the automobile and to increase gas mileage.

SUMMARY

In one exemplary embodiment of the invention a bus bar comprises a bar manufactured from a material that has a density of less than or equal to 2.70 grams per cubic centimeter; where the bar comprises a plurality of holes for facilitating contact between the bus bar and a grounding attachment.

In one exemplary embodiment of the invention a method comprises affixing one or more grounding attachments to a bus bar, where the bus bar comprises a bar manufactured from a material that has a density of less than or equal to 2.70 grams per cubic centimeter; where the bar comprises a plurality of holes for facilitating contact between the bus bar and a grounding attachment; and affixing the bus bar to the frame of an automobile.

The above features and advantages and other features and advantages of the invention are readily apparent from the following detailed description of the invention when taken in connection with the accompanying drawings.

BRIEF DESCRIPTION OF THE FIGURES

The above features and advantages and other features and advantages of the invention are readily apparent from the following detailed description of the invention when taken in connection with the accompanying drawings.

DETAILED DESCRIPTION

Figure 1:
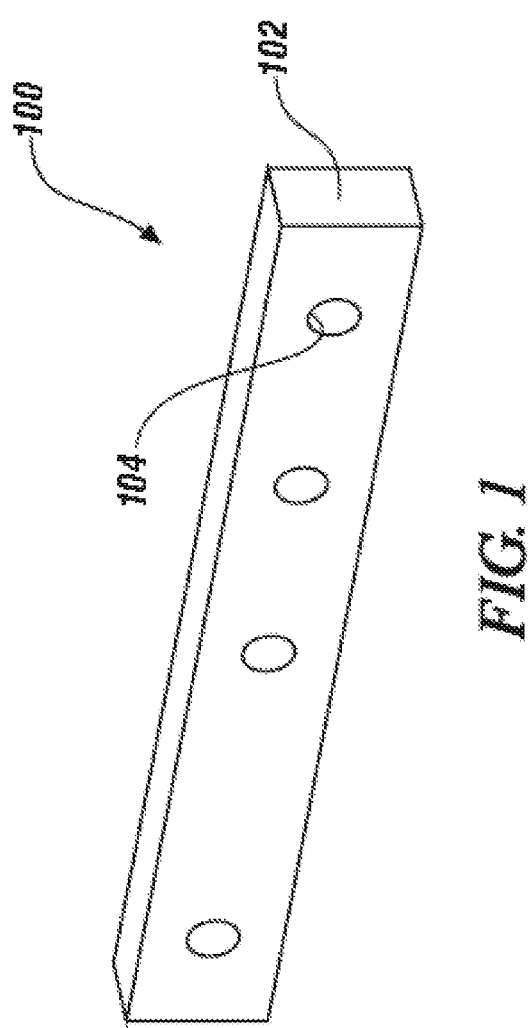
FIG. 1 is a perspective view depicting an electrically conductive bar that embodies features of the invention.

The following description is merely exemplary in nature and is not intended to limit the present disclosure, its application or uses. It should be understood that throughout the drawings, corresponding reference numerals indicate like or corresponding parts and features.

Disclosed herein is a light weight bus bar that is manufactured from materials that have a solid density of less than or equal to 2.7 grams per cubic centimeter (g/cc). The bus bar may be manufactured from a solid metal, a foamed metal, an electrically conductive plastic, an electrically conductive ceramic, or a combination comprising at least one of the foregoing materials. The bus bar detailed herein provides multiple grounding points for automobile electrical systems in a single simple piece. It provides multiple grounding attachments in a local area. It facilitates the easy manufacturing and assembly ground bars and also facilitates a reduction in the weight of the automobile.

With reference now to the FIG. 1, it may be seen that a bus bar 100 comprises an electrically conductive bar 102 that comprises plurality of holes 104. Grounding attachments (not shown) are in electrical communication with the bar 102 via the holes 104. The electrically conductive bar can be manufactured from a solid metal such as aluminum or electrically conductive alloys of aluminum that are lower in density than aluminum. The alloys of aluminum generally include lithium. Lithium is the least dense metal known and may be present in aluminum in amounts of up to 10 weight percent (wt %), specifically up to 5 wt %, and more specifically up to 4.2 wt %, based on the total weight of the bus bar. Other metals such as copper, zirconium, titanium, and the like, may be added to the aluminum-lithium alloy. In an exemplary embodiment, the bus bar is manufactured from aluminum metal.

In one embodiment, the metal bar may be manufactured from a foamed metal. In the event that the metal used in the bus bar is foamed, metals that are denser than aluminum may be used to form the bus bar. The metals are foamed to have a bulk density of less than or equal to 2.7 g/cc. Metals such as titanium, steel, aluminum, copper, hafnium, zirconium, lead, tin, tantalum, chromium, tungsten, zinc, and the like, may be used in their foamed form in the bus bars. In one embodiment, the foamed metal may be sandwiched between two or more layers of solid metal to form the bar 102.

In one embodiment, the foamed bus bars may be manufactured from metals that are disposed upon foamed carbon or other non-conductive foamed materials. Examples of non-conductive foamed materials are glass, polymer (e.g., polycarbonate, polymethylmethacrylate, polystyrene, polyethylene, and the like). The metal coating on the polymer or glass renders the foam electrically conducting. Examples of such foamed bus bars are hafnium over a carbon foam, lead, molybdenum, nickel, nickel-chromium alloy, niobium over a carbon foam, rhenium over a carbon foam, stainless steel, tantalum over a carbon foam, tin, titanium, tungsten over a carbon foam, zinc, zirconium over a carbon foam, or the like, or a combination comprising at least one of the foregoing foams.

In one embodiment, the bus bar may be manufactured from an electrically conductive polymer. The electrically conductive polymer is manufactured by blending a polymer (that is normally electrically insulating) with an electrically conductive filler. The polymer may be a thermoplastic polymer, blend of thermoplastic polymer, thermosetting polymer, or blends of thermoplastic polymers with thermosetting polymer. Examples of the polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polysiloxanes, or the like, or a combination comprising at least one of the foregoing polymers.

Examples of electrically conductive fillers are carbon nanotubes, carbon fibers (manufactured from polyacrylonitrile and/or pitch), carbon black, metal particles, metal fibers (e.g., stainless steel fibers), or the like, or a combination comprising at least one of the foregoing electrically conductive fillers. The electrically conductive polymer may have an electrical volume resistivity that is less than $1 \times 10^{11}$ ohm-cm. The electrically conductive polymer has a density of less than or equal to 2.7 g/cc. The electrically conductive filler may be used in amounts of 2 to 50 weight percent based upon the total weight of the bus bar.

In one embodiment, the electrically conductive polymer may also be foamed. Foaming can be produced by mixing the polymer with a blowing agent and then activating the blowing agent. Examples of blowing agents are carbon dioxide, nitrogen, halofluorocarbons, and the like.

As noted above, the bar 102 has a plurality of holes 104 that are used to provide multiple grounding attachments in a local area. The holes 104 may be threaded and a single fastener (not shown) may be used to facilitate electrical communication between a grounding attachment (e.g., a grounding cable) and the bus bar 100. The fastener may be a screw which can be disposed in the threaded hole 104.

In one embodiment, the bar can be manufactured by cold rolling a metal. The holes are manufactured by drilling, reaming, slotting, milling, or a combination comprising at least one of the foregoing processes. In another embodiment, the bar can be manufactured by milling and slotting, while the holes are manufactured by drilling, reaming, slotting, milling, or a combination comprising at least one of the foregoing processes.

In alternative embodiments, the bus bar can be extruded and the holes can be provided by drilling. In another embodiment, the bus bar can be manufactured by molding or casting. Examples of molding are injection molding or compression molding. The bus bar can have a rectangular or square cross-section. Other cross-sectional geometries such as triangular, circular, and the like, may also be used.

Figure 2:
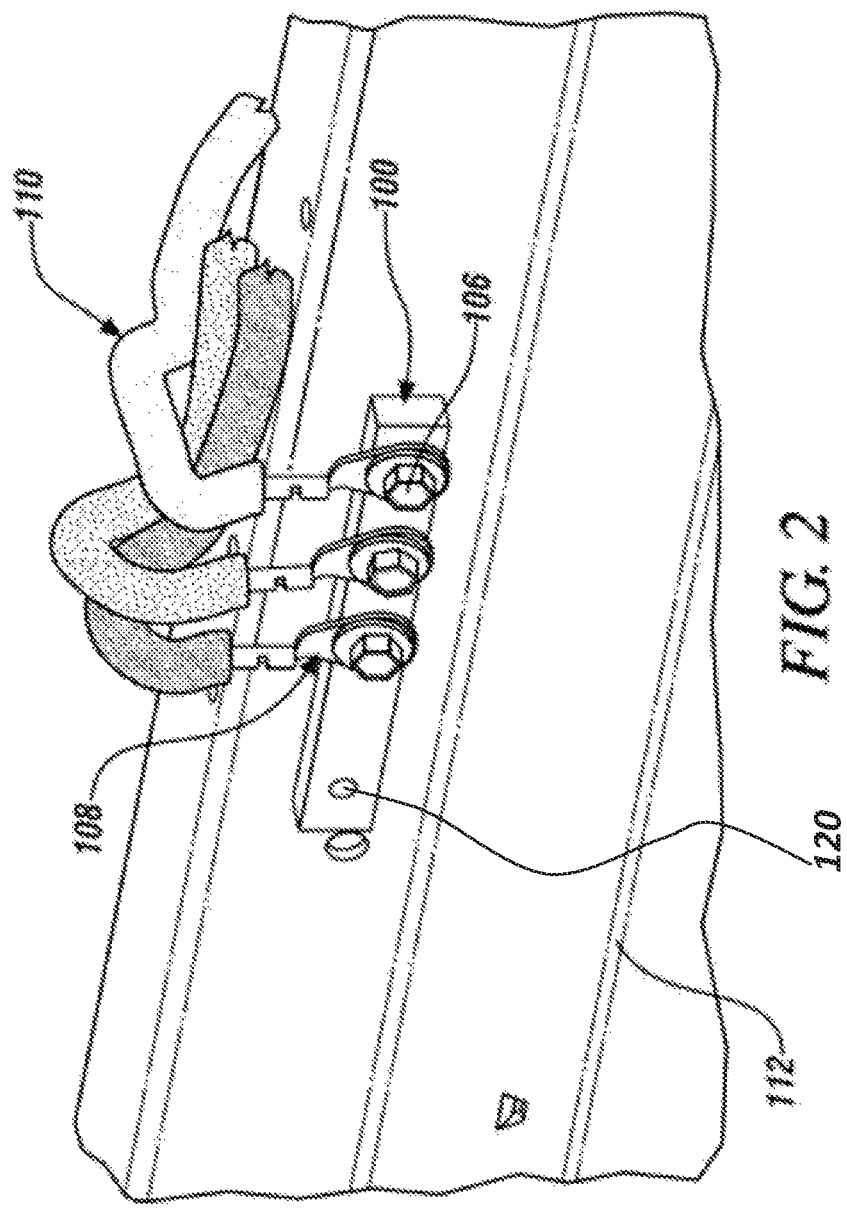
FIG. 2 is another perspective view of the bus bar of the FIG. 1 and the grounding attachments.

The FIG. 2 is a photograph that shows the grounding attachment 110 in communication with the bus bar 100 via a single screw 106. The grounding attachment 110 has a tab 108 with a hole in it through which the single screw 106 passes. The screw 106 is threaded into the threaded hole 104 (not shown) thus securing the grounding attachment 110 to the bus bar 100. This method of grounding is called single point grounding and is advantageous in that it facilitates a quick assembly of the bus bar to the automobile.

As seen in the FIG. 2, the bus bar 100 may be fixedly attached or reversibly attached to a frame of the automobile 112. The bus bar 100 may be fixedly attached to the frame of the automobile 112 via one or more spot welds. In an exemplary embodiment, the bus bar 100 may be fixedly attached to the frame of the automobile 112 via a single spot weld 120. When the bus bar is manufactured from a metal, the spot weld can be produced by a metal inert gas (MIG) weld or a metal active gas (MAG) weld. When the bus bar 100 comprises an electrically conductive polymer, it may be affixed to the automobile frame by heating the polymer to a temperature slightly above the flow temperature and pressing it into the automobile frame. In another embodiment, an electrically conducting adhesive may be used to bond the bus bar to the automobile frame.

The bus bar manufactured in this manner is advantageous in that it can provide single point grounding, ease of manufacturing as well as ease of assembly. The use of a single bar facilitates a weight reduction in the vehicle as well as reduced manufacturing complexity for both the plant and the suppliers of the incoming components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed:

1. A bus bar comprising:
a bar manufactured from a material that has a density of less than 2.70 grams per cubic centimeter; where the bar comprises a plurality of holes for facilitating contact between the bar and a plurality of grounding attachments, where each grounding attachment is affixed to the bar by a single screw or lug to provide electrical contact between the bar and the grounding attachment, and where the bus bar is bonded to a frame of an automobile by a single spot weld.

2. The bus bar of claim 1, where the bar comprises aluminum.

3. The bus bar of claim 2, where the bar further comprises lithium.

4. The bus bar of claim 1, where the bar comprises a foamed metal.

5. The bus bar of claim 1, where the bar comprises an electrically conductive plastic.

6. The bus bar of claim 5, where the electrically conductive plastic comprises an electrically conductive filler.

7. The bus bar of claim 6, where the electrically conductive filler comprises carbon nanotubes, carbon fibers, carbon black, metal particles, or a combination thereof.

8. The bus bar of claim 5, where the electrically conductive plastic is foamed.

9. A method comprising:
affixing one or more grounding attachments to a bus bar, where the bus bar comprises:
a bar manufactured from a material that has a density of less than 2.70 grams per cubic centimeter; where the bar comprises a plurality of holes for facilitating contact between the bar and a plurality of grounding attachments, where each grounding attachment is affixed to the bar by a single screw or lug to provide electrical contact between the bar and the grounding attachment; and
affixing the bus bar to the frame of an automobile by a single spot weld.

* * * * *